No. 862,192. PATENTED AUG. 6, 1907.
W. A. PARIS.
CONTROLLING MEANS FOR ELECTRIC MOTORS.
APPLICATION FILED DEC. 4, 1905.
3 SHEETS—SHEET 1.
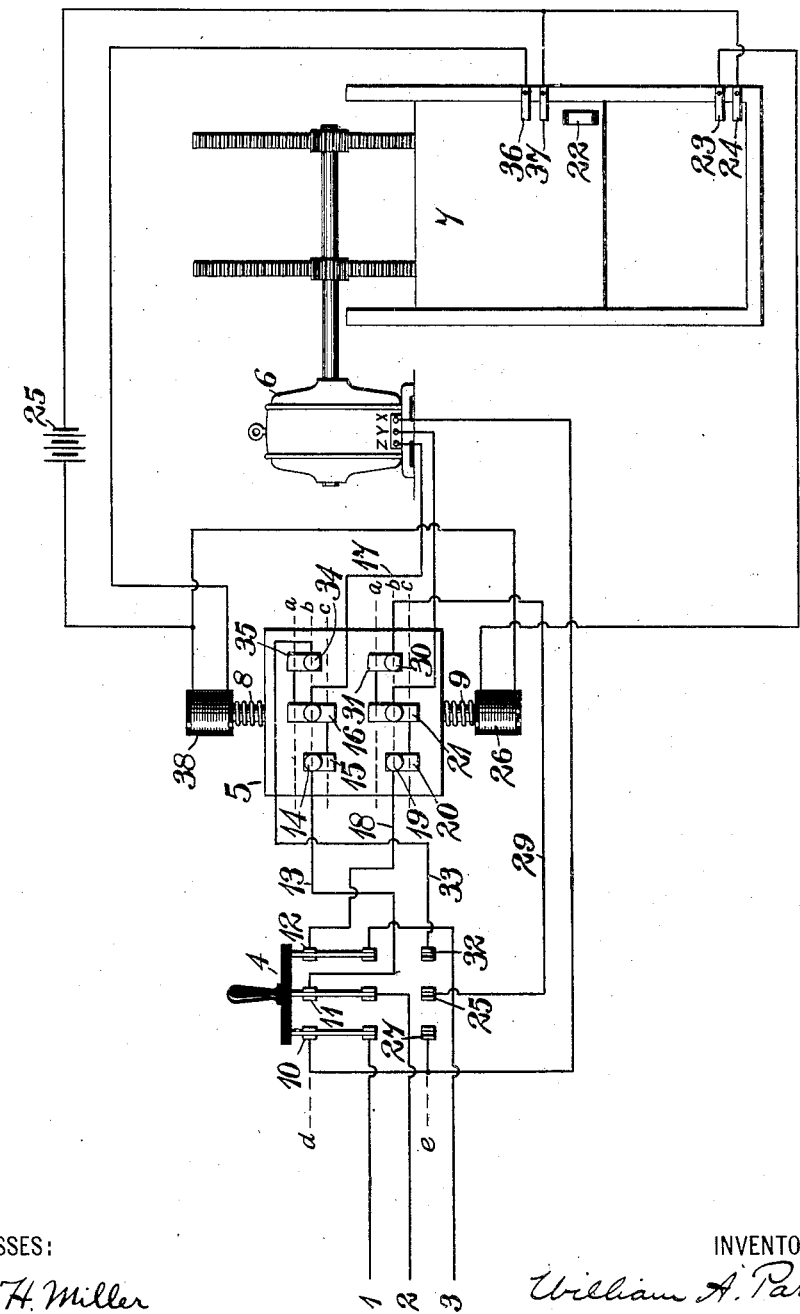
WITNESSES:
Fred. H. Miller
INVENTOR
William A. Paris
BY
ATTORNEY

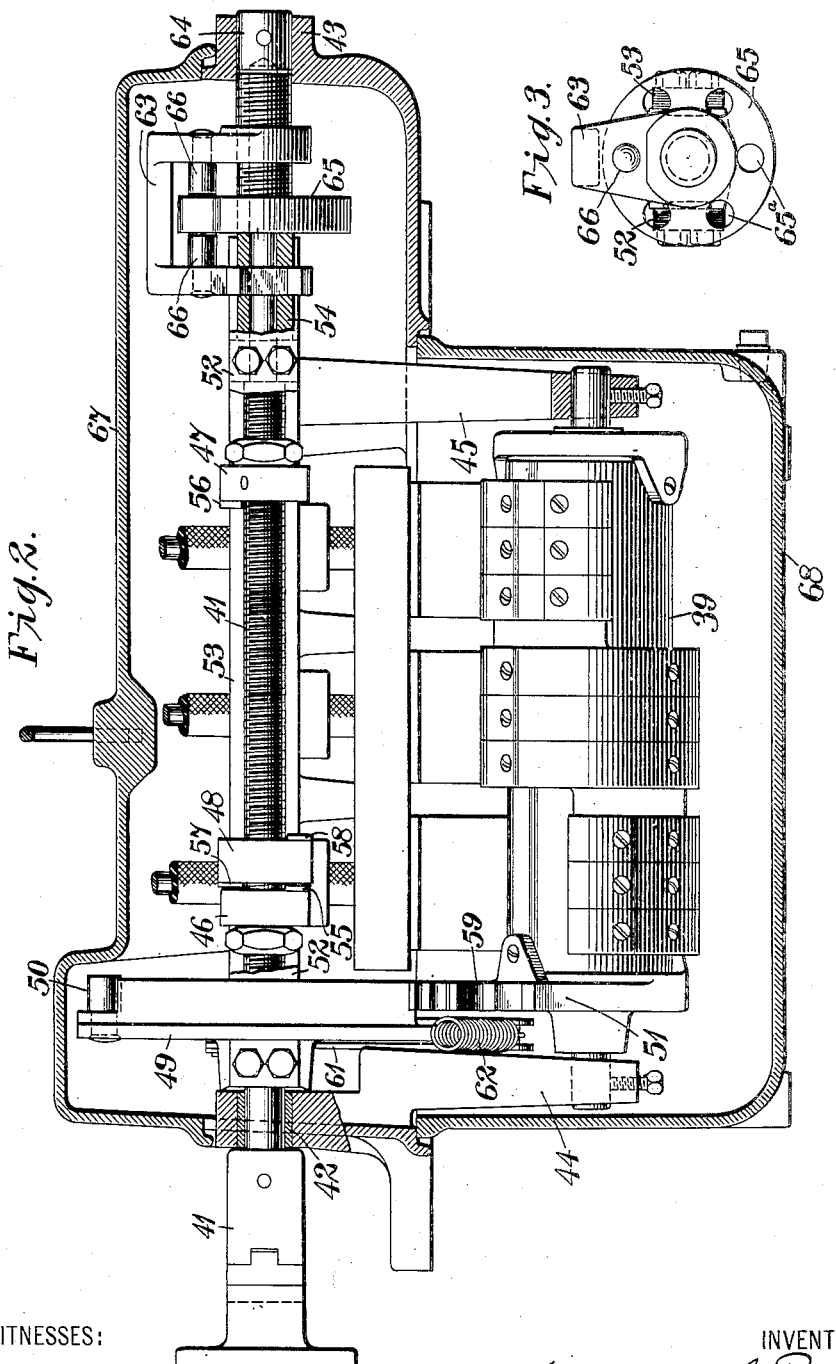

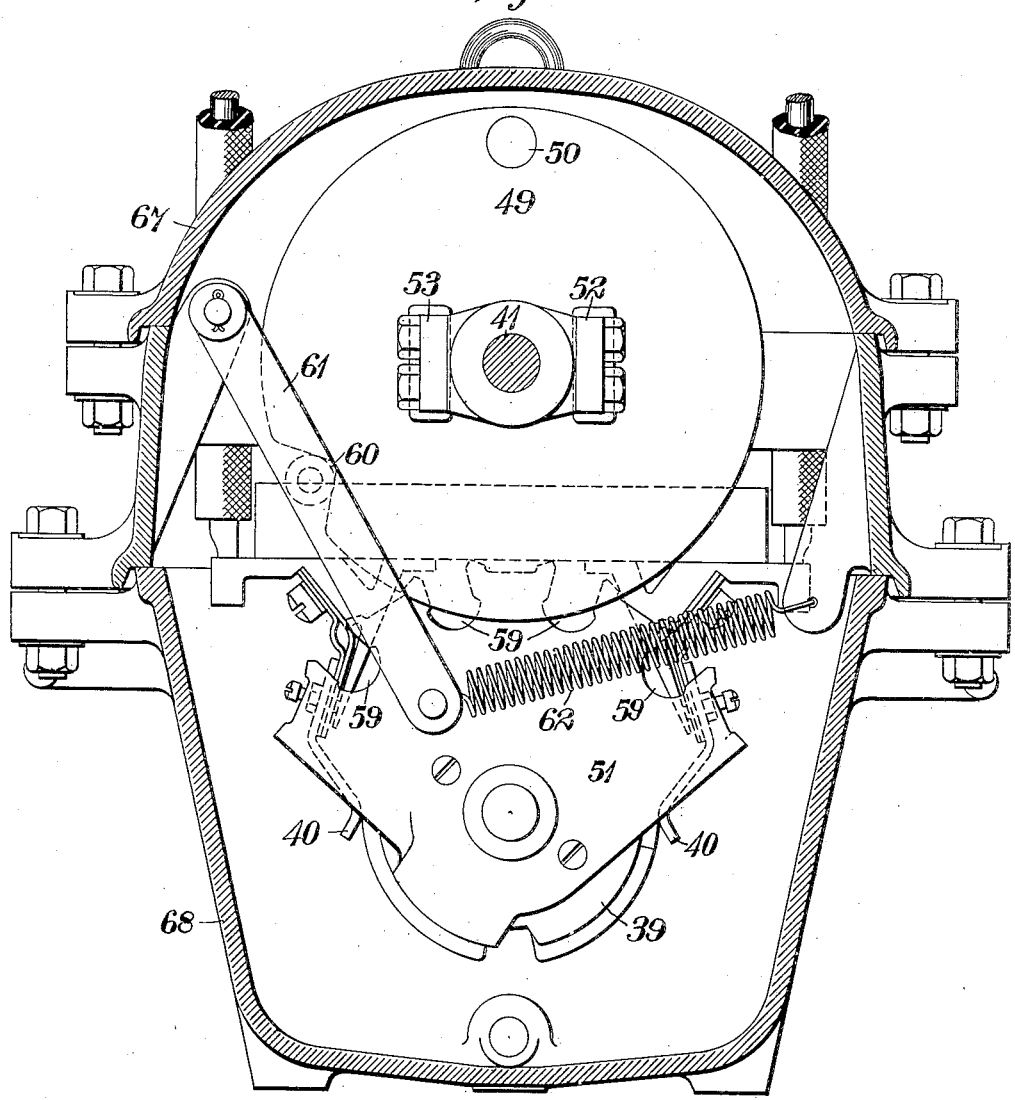

UNITED STATES PATENT OFFICE.

WILLIAM A. PARIS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONTROLLING MEANS FOR ELECTRIC MOTORS.

No. 862,192.  Specification of Letters Patent.  Patented Aug. 6, 1907.

Application filed December 4, 1905. Serial No. 290,308.

*To all whom it may concern:*

Be it known that I, WILLIAM A. PARIS, a citizen of the United States, and a resident of Edgewood Park, in the county of Allegheny and State of Pennsylvania, have invented a new and useful Improvement in Controlling Means for Electric Motors, of which the following is a specification.

My invention relates to means for automatically confining a motion of translation, produced by an electric motor, to predetermined limits and it has special reference to such means as are adapted for controlling motors which are utilized for opening and closing gate-valves.

The object of my invention is to provide controlling means that shall be simple and durable in construction and effective in operation; that shall automatically interrupt the motor circuit at predetermined adjustable limits in its operation; that shall arrange the circuits for reverse operation and that shall provide for the irregularity of the motor retardation after the circuit has been interrupted without interfering, in intermediate positions of the motor travel, with its normal control by any suitable means for running in either direction.

When electric motors are employed for the operation of gate-valves, hoists or elevators or other devices or machines having predetermined limits of travel, it is desirable to provide means for opening the motor circuit when the limit of travel is reached in either direction without interfering with the operation of the motor in the reverse direction and for automatically maintaining suitable motor circuit arrangements for operation in either direction in all intermediate portions of the motor travel. In order to accomplish these results, I have provided a limiting device that comprises a rotatable, contact-carrying drum to be actuated indirectly from a shaft that is driven by the rotatable member of the motor and is so arranged and interlocked with the rotatable drum that it is free to rotate independently through a predetermined number of revolutions which correspond to the desired degree of motion of the driven member. When the limit of travel of the driven member in either direction is reached, the shaft engages a pawl which interlocks with a cam that is attached to the rotatable drum and moves said drum from its normal intermediate position, in which suitable motor connections may be completed for operation in either direction, to a position in which the motor circuit is interrupted, thereby bringing the motor to rest. When the motor has been stopped, as above described, it may be operated only in the reverse direction and since it is desirable to reëstablish motor connections for operation in either direction as soon as the motor has traveled an appreciable distance in the reverse direction, I have provided means for so connecting the driving shaft with the aforesaid engaging pawl that the rotatable drum is brought to its normal mid position when the motor has first started in the reverse direction.

My invention is illustrated in the accompanying drawings, in which

Figure 1 is a diagrammatic view of the electrical connections for a limiting device applied to a system of electric motor control. Fig. 2 is a longitudinal elevation of a limiting device having its outer casing shown in section to disclose the operating parts. Fig. 3 is a detail view of some of the parts shown in Fig. 2, and Fig. 4 is an end elevation of the structure shown in Fig. 2, with the casing in section.

Referring specially to Fig. 1, electrical energy is supplied from a three-phase alternating current circuit 1, 2, 3, through a reversing switch 4 and a limiting device 5, to an electric motor 6, which is arranged for opening and closing a gate-valve 7. The reversing switch 4 may occupy either position $d$ or position $e$, at the will of the operator, and the limiting device 5 is provided with a plurality of positions $a$, $b$ and $c$ which are automatically assumed according to the position of the gate-valve 7, the device normally occupying the position $b$ by reason of a pair of centering springs 8 and 9 when the gate-valve 7 is in any intermediate position. Assuming that the valve 7 occupies an intermediate position in its travel; that the limiting device 5 occupies the position $b$, and the reversing switch 4 occupies position $d$, connections are completed from the three-phase circuit 1, 2, 3, through contact members 10, 11, 12 of the switch 4. The contact member 10 is connected directly to the terminal X of the motor 6 and contact member 11 is connected, through conductor 13, contact finger 14, contact members 15 and 16 and conductor 17, to the motor terminal Z, while contact member 12 is connected through conductor 18, contact finger 19 and contact members 20 and 21, to the motor terminal Y. Under these conditions, the motor will close the gate-valve 7, but the closing movement may be stopped, if desired, by opening the reversing switch 4. While the valve operation is thus always under the control of an attendant, if the valve is allowed to become completely closed, the motor will be automatically brought to rest by reason of the engagement of a bridging contact 22 on the gate-valve 7 with stationary terminals 23 and 24 to complete electrical connections from any convenient source, such as a battery 25, through an electro-magnet 26. The electro-magnet 26, when energized, moves the limiting device 5 from the mid position $b$ to the position $a$ and thus interrupts the motor supply line conductors 13 and 18, since the contact fingers 14 and 19 are moved out of engagement with contact members 15 and 20. The interruption of these two circuits stops the motor irrespective of the fact that the reversing switch 4 occupies the position $d$. When it becomes desirable to operate the motor in the opposite direction to open the valve, the reversing switch 4 may be thrown to the position $e$, to connect the conductor 1, through contact member 27, to the motor terminal X; conductor 2, through contact member 25, conductor 29, contact finger 30 and contact members 31 and 21, to the motor terminal Y, and conductor 3, through contact member 32, conductor 33, contact finger 34, contact members 35 and 16 and conductor 17, to the motor terminal Z. Thus the terminals Y and Z, which were previously connected to the conductors 2 and 3, are now connected to the conductors 3 and 2, respectively, so that the motor will operate in the reverse direction and the gate-valve will be opened. As soon as the contact member 22 on the gate-valve is moved out of engagement with the contact terminals 23 and 24, the electromagnet 26 is deënergized and the springs 8 and 9 return the limiting device 5 to its mid position $d$. If the motor is allowed to continue running in this direction until the gate-valve is fully opened, contact member 22 will move into engagement with a pair of contact terminals 36 and 37 and thus complete the external circuit of the battery 25 through an electro-magnet 38 which is opposite the magnet 26 and, when energized, moves the limiting device 5 into the position $c$ to interrupt the circuit previously completed through the conductors 33 and 29 and thereby stop the motor. In this way, the limiting device serves to automatically interrupt the motor circuits when the gate-valve reaches its extreme limits of travel without interfering with the control of the valve through the motor, in any intermediate positions, by means of the reversing switch 4.

Figs. 2, 3 and 4 illustrate a preferred mechanical structure for performing the functions ascribed to the limiting device 5 of Fig. 1. As here shown, the device 5 comprises a rotatably mounted contact-carrying drum 39 which is engaged by a plurality of contact fingers 40, and a driving shaft 41, which is actuated, either directly or indirectly, by the motor in connection with which the limiting device is used. The driving shaft 41 is mounted in bearings 42 and 43 that may be integral with arms 44 and 45 the free ends of which are provided with bearings for the shaft of the drum 39, the axes of the two shafts being parallel. The portion of the shaft 41 between its bearings is screw-threaded over substantially its entire length and is provided with a pair of similar collars 46 and 47 between which a traveling nut 48 is located. A rotatable cam 49, the axis of which is in alinement with the shaft 41, is provided with a laterally projecting pin or stud 50 which may engage a cam 51 supported by the drum 39 when the cam 49 is rotated. A pair of guide strips 52 and 53 project from the cam 49 parallel to the shaft 41 and slightly removed therefrom so that they prevent the traveling nut 48 from rotating independently of the cam, the opposite ends of the guide strips being fixed to a rotatably mounted bushing 54. The collars 46 and 47 are provided with projections 55 and 56 to respectively engage similar projections 57 and 58 on the traveling nut 48 and are so arranged that, as the nut moves along the shaft 41 it engages either the one or the other of collars 46 and 47. The engagement of the nut projections with the projection on the collar 46 or the collar 47, as the case may be, serves, in conjunction with the strips 52 and 53, to lock the cam 49 to the shaft 41 so that its stud 50 will engage one of the notches 59 in the cam 51 to so rock the drum 39 as to open the motor circuit. The extent of the motor operation may be varied by adjusting the position of the collars 46 and 47 along the shaft 41, set-nuts being provided to lock them in any position to which they may be adjusted. The cam 49 normally occupies a position which is determined by the engagement of a roller 60 with a notch in its periphery, the roller 60 being attached to a pivotally mounted lever 61 and being held in engagement with the periphery of the cam by a spring 62. The cam 51 may obviously be provided with only a single notch at each side of its mid position to correspond to positions $a$ and $c$, respectively, but it has been found desirable to provide a plurality of notches at each side which may be consecutively engaged by the pawl 50 as it makes the necessary number of revolutions, all those on one side maintaining the circuit connections indicated by a single position in Fig. 1 in order to allow for the drift of the motor after its supply circuit has been interrupted. After the drum 39 has been moved from its central position in one direction, if the motor is then rotated in the opposite direction, the nut 48 will obviously be separated from the collar which it engages and will begin to travel along the shaft toward the other collar. In order to return the drum 39 to its normal position as soon as the motor is reversed, so that the motor will be free to operate in either direction, as hereinbefore explained in connection with Fig. 1, I have provided a device that comprises a yoke 63, one arm of which is rotatably mounted upon the bushing 54 and the other of which is screw-threaded with a relatively considerable pitch onto a sleeve 64 which forms a part of the shaft bearing 43 and which is stationary. The yoke 63 is further provided with two inwardly projecting pins 66, between which a disk 65, that is attached to the shaft 41, is free to rotate, under normal conditions. The disk 65 is provided with a plurality of openings 65$^a$, one of which may be engaged by one of the pins 66 if the yoke rotates in either direction, since any such rotation will necessarily cause the yoke to travel along the bushing 64 by reason of the screw-thread engagement between said parts. The guide strips 52 and 53 extend beyond the bushing 54 and engage one arm of the yoke 63 so that rotary movement of the guide strips is transmitted to the yoke. In this way, the cam 49, guide strips 52 and 53, the yoke 63 and the shaft 41 must rotate together when the cam 49 is moved from its normal mid position. After the motor has been brought to rest by reason of the traveling nut 48 coming into engagement with one of the collars 46 and 47 and is then reversed, the cam 49 may be returned to its normal position by reason of the engagement of one of the pins 66 with one of the holes 65$^a$. Since the clearance between the disk 65 and the ends of the pins 66 is small, the cam must pass through the same arc of rotation after reversal of the motor that it passed through while the motor was being brought to rest. The return of the cam 49 necessarily brings the drum 39 back to its normal mid position, the process being repeated in the opposite direction when the motor has reached the other end of its travel, by the engagement of the traveling nut 48 with the other collar. The mechanism is inclosed in a case 67, and in order that the rotatable drum 39 may be immersed in oil, the lower part of the case is in the form of a tank 68 that is detachable from the body of the case.

Variations in size and arrangement of details may of course be made within the scope of my invention.

I claim as my invention:

1. The combination with an electric motor, and a reversing switch therefor, of an automatic limiting device comprising a rotatable contact-carrying drum driven by suitable interlocking cams at predetermined points in the motor operation, and means for returning said limiting device to its normal position, said means being dependent upon the starting of the motor in the reverse direction after it has been brought to rest by said limiting device.

2. The combination with a normally reversible driving motor, means for interrupting the supply of energy to the motor at predetermined limits of movements in either direction and for preventing the starting of the motor in the same direction, and means for reëstablishing the reversibility of the motor at said predetermined limits irrespective of the movement of the motor after the interruption of its supply of energy.

3. The combination with a normally reversible electric driving motor, means for automatically interrupting the motor supply circuit at predetermined limits of movement in either direction and for preventing the starting of the motor in the same direction, of means for reëstablishing the reversibility of the motor at said predetermined limits irrespective of its movement after the interruption of its supply circuit.

4. The combination with a normally reversible electric driving motor, a limiting device therefor comprising a screw-threaded shaft driven by the motor, limiting pawls fixed to the shaft, a traveling nut located on said shaft between the pawls, a rotatably mounted interlocking cam and guide strips attached thereto for preventing the independent rotation of the nut, a rotatable contact-carrying drum actuated by said interlocking cam, and means for preventing the starting of the motor in the same direction after its supply of energy has been interrupted by the limiting device, of means for reëstablishing the reversibility of the motor at the limits established by the limiting device irrespective of the movements of the motor after the interruption of its supply circuit.

5. A limiting device for electric motors comprising a screw-threaded shaft driven by the motor, limiting pawls fixed to the shaft, a traveling nut located on the shaft between the pawls, a rotatably mounted interlocking cam and guide strips attached thereto for preventing the independent rotation of the nut, a movable switching member, an actuating cam attached thereto, and means for connecting the rotatable cam-bearing member to the shaft after the nut has engaged either of the said limiting pawls.

6. A limiting device for electric motors comprising a screw-threaded shaft driven by the motor, limiting pawls fixed to the shaft, a traveling nut located on the shaft between the pawls, a rotatably mounted interlocking cam and guide strips attached thereto for preventing the independent rotation of the nut, and means for interrupting the supply of energy to the motor when the nut engages either of the limiting pawls, of means for so taking up the motion due to the momentum of the motor, after the supply circuit is interrupted that the reversibility of the motor will be reëstablished at the point where the circuit was interrupted when the motor was started in the reverse direction.

7. The combination with an electric motor employed for producing a limited translational motion, means for automatically opening the motor circuit when a predetermined and adjustable limit of the motion is reached in either direction and for confining the first motor operation after the motor comes to rest to reverse rotation, of means for reëstablishing the reversibility of the motor at said predetermined limits when the motor is started from rest after having been automatically stopped.

8. A limiting device for electric motors that comprises a screw-threaded shaft which is driven from the motor, limiting pawls which are fixed to the shaft, a traveling nut located on said shaft between the pawls, a rotatably mounted interlocking cam and guide strips attached thereto for preventing the independent rotation of the nut, a rotatable contact-carrying drum, stationary engaging fingers therefor, a driving cam attached thereto which engages said interlocking cam, and means for connecting a rotatable cam-bearing member to the shaft after the nut has reached either end of its travel.

9. A limiting device for electric motors that comprises a screw-threaded shaft which is driven from the motor, limiting pawls which are adjustably fixed to the shaft, a traveling nut located on said shaft between the pawls, a rotatably mounted interlocking cam and guide strips attached thereto for preventing the independent rotation of the nut, a rotatable contact-carrying drum, stationary engaging fingers therefor, a driving cam attached thereto which engages said interlocking cam, and means for interconnecting a rotatable cam-bearing member to the shaft after the nut has reached either end of its travel.

10. A limiting device for electric motors that comprises a screw-threaded shaft which is driven from the motor, limiting pawls which are fixed to the shaft, a traveling nut located on said shaft between the pawls, a rotatably mounted interlocking cam and guide strips attached thereto for preventing the independent rotation of the nut, a rotatable contact-carrying drum, stationary engaging fingers therefor, a driving cam attached thereto which engages said interlocking cam and means for connecting the rotatable cam-bearing member to the shaft after the nut has reached either end of its travel that comprises a yoke which is driven by the guide strips and engages a screw-threaded stationary bearing which forms a bearing for the shaft, having inwardly projecting plugs, and a disk which is attached to the shaft and normally rotates between the plugs.

11. A limiting device for electric motors that comprises a screw-threaded shaft which is driven from the motor, limiting pawls which are adjustably mounted on the shaft, a traveling nut located on said shaft between the pawls, a rotatably mounted interlocking cam and guide strips attached thereto for preventing the independent rotation of the nut, a rotatable contact-carrying drum, stationary engaging fingers therefor, a driving cam attached thereto which engages said connecting cam, and means for interlocking the cam-bearing member to the shaft until the drum has been returned to its central position that comprises a yoke which is driven by the guide strips and engages a screw-threaded stationary bearing which forms a bearing for the shaft, having inwardly projecting plugs, and a disk which is attached to the shaft and normally rotates between the plugs.

In testimony whereof, I have hereunto subscribed my name this 22nd day of November, 1905.

WILLIAM A. PARIS.

Witnesses:
R. W. COPELAND,
BIRNEY HINES.